United States Patent
Sasaki et al.

(10) Patent No.: US 8,296,089 B2
(45) Date of Patent: Oct. 23, 2012

(54) METHOD FOR COMPENSATING FOR ANGULAR TRANSMISSION ERROR OF WAVE GEAR DEVICE

(75) Inventors: Kozo Sasaki, Azumino (JP); Yoshifumi Okitsu, Azumino (JP); Toshio Yajima, Azumino (JP); Makoto Iwasaki, Nagoya (JP)

(73) Assignees: Harmonic Drive Systems Inc., Tokyo (JP); National University Corporation Nagoya Institute of Technology, Nagoya-Shi, Aichi (JP)

( * ) Notice: Subject to any disclaimer, the term of this patent is extended or adjusted under 35 U.S.C. 154(b) by 218 days.

(21) Appl. No.: 12/865,297

(22) PCT Filed: Mar. 8, 2010

(86) PCT No.: PCT/JP2010/001608
§ 371 (c)(1),
(2), (4) Date: Jul. 29, 2010

(87) PCT Pub. No.: WO2010/116607
PCT Pub. Date: Oct. 14, 2010

(65) Prior Publication Data
US 2011/0054820 A1     Mar. 3, 2011

(30) Foreign Application Priority Data
Apr. 7, 2009    (JP) ................... 2009-093103

(51) Int. Cl.
*G01C 17/38*     (2006.01)
(52) U.S. Cl. ............. 702/94; 701/41; 701/42; 701/44
(58) Field of Classification Search .......... 702/94; 318/632–639, 560; 701/41, 42, 44
See application file for complete search history.

(56) References Cited

U.S. PATENT DOCUMENTS
6,505,703 B2 *   1/2003   Stout et al. ............ 180/446
(Continued)

FOREIGN PATENT DOCUMENTS
JP    62-224802 A    10/1987
(Continued)

OTHER PUBLICATIONS
International Search Report (PCT/ISA/210) issued on Apr. 13, 2010, by the Japanese Patent Office as the International Searching Authority for International Application No. PCT/JP2010/001608.
(Continued)

*Primary Examiner* — Sujoy Kundu
(74) *Attorney, Agent, or Firm* — Buchanan Ingersoll & Rooney PC (57) ABSTRACT

A positioning system (1) provided with an actuator (2) having a wave gear device (4) is driven and controlled by a semi-closed loop control for controlling the load position of a load device (5) based on the motor position of a motor shaft (31) of a motor (3). In a method for compensating for an angular transmission error by compensating for a motor shaft synchronous component θSync that occurs in synchrony with the motor position and is a relative rotation-synchronous component that includes an angular transmission error component of the wave gear device (4), the positioning system (1) is represented as a two-inertia model, and the motor shaft synchronous component θSync is represented as an oscillation source for producing a twisting action between the two inertia bodies in the two-inertia model. A motor current command iref is corrected by a compensation current command icomp calculated so as to allow the effect of the motor shaft synchronous component θSync on the load position to be compensated in this case, and a motor position command r is corrected by a motor position correction signal θcomp calculated in order to compensate for the effect of the motor shaft synchronous component θSync.

1 Claim, 6 Drawing Sheets

Block diagram of actuator with synchronous components.

U.S. PATENT DOCUMENTS 6,901,320 B2 * 5/2005 Yao et al. .................. 701/44
2009/0200979 A1 8/2009 Sasaki et al.

FOREIGN PATENT DOCUMENTS

| | | |
|---|---|---|
| JP | 11-264448 A | 9/1999 |
| JP | 2002-176790 A | 6/2002 |
| JP | 2009-187404 A | 8/2009 |

OTHER PUBLICATIONS

Mizuno Tomohiro et al., "Mathematical Modeling for Angular Transmission Error by Gear Accuracy of Harmonic Drive", Tokkai-Section Joint Conference of the 8 Institutes of Electrical and Related Engineers, 1 page.

* cited by examiner

Modeling results of synchronous components.

Fig. 3

Block diagram of actuator with synchronous components.

Fig. 4

Modeling of actuator with synchronous components.

Fig. 5

Block diagram of 2DOF controller with synchronous component compensation.

Fig. 6

Block diagram of current command $i_{comp}$
for compensating synchronous components $\theta_{Sync}$.

Fig. 7

Block diagram of for synchronous component compensator.

Synchronous component model for compensation.

Fig. 9

Response waveforms for target angle of 87.12 Load deg.

Fig. 10

Response waveforms for target angle of 86.4 Load deg.

METHOD FOR COMPENSATING FOR ANGULAR TRANSMISSION ERROR OF WAVE GEAR DEVICE

TECHNICAL FIELD

The present invention relates to a method for compensating for an angular transmission error of a wave gear device in cases in which driving and controlling an actuator constructed so as to reduce the speed of output rotation of a motor via the wave gear device and to transmit the output rotation to a load device are performed by a semi-closed loop control for controlling the position of the load shaft of the load device on the basis of the detected position of the motor shaft.

More specifically, the present invention relates to a method for compensating for an angular transmission error in order to inhibit or prevent oscillations brought about by a motor shaft synchronous component occurring in synchrony with the motor position (rotational position of the motor shaft) as an angular transmission error component (relative rotation-synchronous component) that occurs in synchrony with the relative rotation of each constituent element of the wave gear device. The angular transmission error component (relative rotation-synchronous component) is brought about by low gear precision in the wave gear device, a difference between the shaft centers of the wave gear device and the load, and other fabrication errors, and is present even in cases in which torque is not applied to the wave gear device.

BACKGROUND ART

A wave gear device has a flexspline (below, "F/S") that is a flexible, externally toothed gear that deforms elastically; a circular spline that is a rigid, internally toothed gear; and a wave generator that is an elliptical cam. The flexspline is deformed to an ellipse by the wave generator and is meshed with the circular spline, and the meshing position of the two splines is moved by the rotation of the wave generator. A reduced rotational output that corresponds to the difference in the number of teeth of the two splines can thereby be produced from one of the splines. Wave gear devices are speed reducers characterized by small size, high torque capacity, the absence of a backlash, and other characteristics.

In general, in a drive system for positioning or the like of a load-side member using an actuator provided with a motor and a speed reducer, an encoder is attached to the motor shaft, and a semi-closed loop control system is used for controlling the load position (rotational position of the load shaft) on the basis of the motor position (rotational position of the motor shaft) obtained from the encoder. This is because the encoder often cannot be attached to the load shaft and because the theoretical resolution of the load shaft is multiplied by the reduction ratio of the resolution of the motor shaft encoder, allowing the load shaft to be controlled at high resolution. However, an "angular transmission error," which is the difference between the actual load position and the theoretical load position of the speed reducer calculated from the motor position as a controlled amount, is created in the speed reducer by the backlash, machining errors, or the like. It is therefore difficult to control the load position with a precision comparable with the theoretical resolution of the load shaft.

In a system that uses a wave gear device as a speed reducer, the absence of a backlash can markedly reduce angular transmission errors in comparison with cases in which other speed reducers are used. However, positioning precision is adversely affected by angular transmission errors (below, "relative rotation-synchronous components") synchronized with rotation and brought about by low gear precision, a difference between the shaft centers of the speed reducer and the load, and other fabrication errors, and angular transmission errors brought about by the non-linear elastic deformation of the flexspline. In addition, numerous analyses, modeling, and compensation methods have been reported because such error components act to excite oscillations during positioning response and other types of acceleration and deceleration, as well as non-linear torsional oscillations due to the flexibility of the wave gear device. In particular, there are many compensation methods aimed at inhibiting torsional oscillations because a large resonance is established when the cycle of the relative rotation-synchronous components coincides with the frequency of the torsional oscillation. Against this background, the present inventors have previously proposed a method for compensating for angular transmission errors that addresses the issue of static positioning precision and involves modeling the entire actuator, including the relative rotation-synchronous components in the following Document.

"Mathematical Modeling for Angular Transmission Error by Gear Accuracy of Harmonic Drive Gearing," Tokai-Section Joint Conference of the 8 Institutes of Electrical and Related Engineers, O-140 (2007), (Tomohiro MIZUNO, Masafumi YAMAMOTO, Makoto IWASAKI, Motohiro KAWAFUKU, Hiromu HIRAI, Yoshifumi OKITSU, Kozo SASAKI, Toshio YAJIMA)

SUMMARY OF THE INVENTION

Problems to Be Solved by the Invention

The following components are known as relative rotation-synchronous components of a wave gear device: the motor shaft synchronous component, which is a component synchronized with the rotation of the motor shaft (input shaft of the wave gear device); the F/S-W/G relative rotation-synchronous component, which is caused by the relative rotation of the flexspline (F/S) and the wave generator (W/G); and the load shaft synchronous component, which is a component synchronized with the rotation of the actuator output shaft (load shaft). Among these, the F/S-W/G relative rotation-synchronous component has no reproducibility in measured results, and the load shaft synchronous component has amplitude that varies with the assembled state of the load, and there are no means available to measure the absolute angle of the load shaft. It is therefore impossible to compensate for these synchronous components in a semi-closed loop control system.

In conventional practice, the motor shaft synchronous component is compensated and positioning precision improved by adding, to the position command or the position feedback, an amount of correction of a component synchronized with the flexspline based on the point of origin of the load shaft. With the conventional compensation methods, however, it is difficult to inhibit positioning errors at times other than during a no-load operation.

An object of the present invention is to provide a method for compensating for an angular transmission error of a wave gear device in a processor arranged as a semi-closed control system for driving and controlling a load-side member using an actuator provided with a wave gear device, wherein a motor shaft synchronous component, which is an angular transmission error of the wave gear device, is compensated for by controlling the motor attached to the wave gear device, whereby the positioning precision of the output shaft of the wave gear device can be improved and oscillations occurring due to a dynamic motor shaft synchronous component during the positioning response can be inhibited.

Means for Solving the Problems

In order to solve the aforementioned problems, the present invention proposes a method for compensating for an angular transmission error of a wave gear device in a semi-closed loop control system in which an actuator for reducing the speed of output rotation of a motor via the wave gear device and transmitting the output rotation from the load shaft to the load device is driven and controlled by controlling the position of the load shaft on the basis of the detected position of the motor shaft of the motor; the method characterized in that:

a motor shaft synchronous component θSync occurring in synchrony with a motor position θm, which is a rotational position of the motor shaft, is determined by Formula (A), the motor shaft synchronous component being an angular transmission error component that occur in synchrony with the relative rotation of each constituent element of the wave gear device, and the motor shaft synchronous component being present even in cases in which torque is not applied to the wave gear device

[Mathematical Formula A]

$$\theta_{Sync}(\theta_m) = \sum_{i=1}^{n} A_i \sin(k_i \theta_m + \phi_i); \quad (A)$$

the actuator is represented as a two-inertia model constructed from a motor-side inertia body including the rotor of the motor and the input shaft of the wave gear device, and a load-side inertia body including the output shaft of the wave gear device and the load device;

the motor shaft synchronous component θSync (θm) calculated from the motor position θm is applied as twisting between the motor-side inertia body and the load-side inertia body;

the motor shaft synchronous component θSync (θm) is considered to be an oscillation source, and a motor current command iref is corrected by a compensation current command icomp determined by Formula (B) in order to compensate for the effect of the motor shaft synchronous component θSync (θm) on the load position θl, which is the rotational position of the load shaft

[Mathematical Formula B]

$$i_{comp}(s) = \frac{C_i(s)}{s^2} \ddot{\theta}_{Sync}(s), \quad (B)$$

where Ci(s) is a transfer function, and

θ"Sync is the second-order differential of the motor shaft synchronous component; and the motor position command r is corrected by the motor position correction signal θcomp determined by Formula (C)

[Mathematical Formula C]

$$\theta_{comp}(s) = \frac{1}{s^2} C_\theta(s) \ddot{\theta}_{Sync}(s), \quad (C)$$

where Cθ(s) is a transfer function.

Effect of the Invention

The motor shaft synchronous component included in the angular transmission error of a wave gear device is an angular transmission error component that is created by a cumulative pitch error of the flexspline and the circular spline. In the compensation method according to the present invention, the motor shaft synchronous component is considered to be an oscillation source, and the effect of the motor shaft synchronous component on the load position is canceled out by the compensation current command, resulting in a state in which there is no action of the motor shaft synchronous component. As a result, the reduction of the positioning precision by the motor shaft synchronous component can be inhibited or prevented, and compensation can be provided for the oscillation component brought about by the dynamic motor shaft synchronous component during the positioning response.

EMBODIMENT FOR CARRYING OUT THE INVENTION

Configuration of Positioning System

Figure 1:
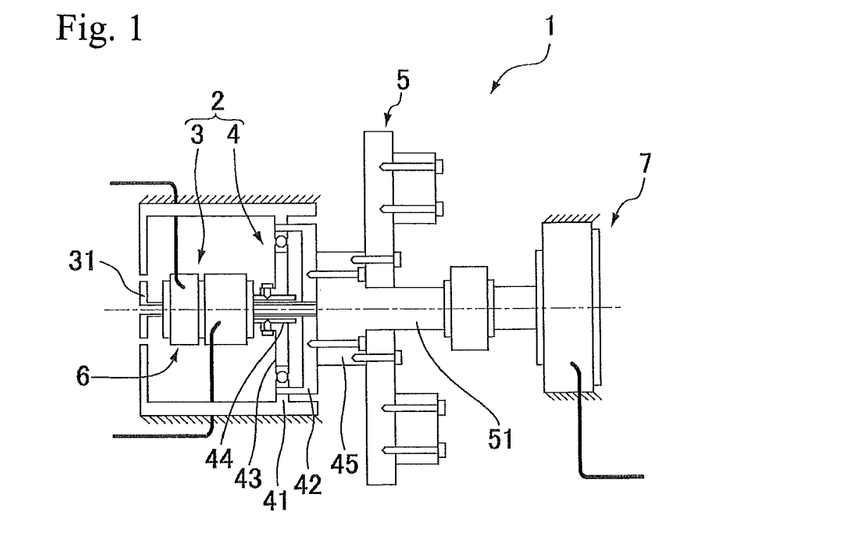
FIG. 1 is a schematic diagram showing a positioning system used in an embodiment of the present invention.

FIG. 1 is a schematic view of a positioning system (experimental device) that includes an actuator provided with a wave gear device and used in the present embodiment, and Table 1 shows the specifications. An actuator 2 incorporated into a positioning system 1 has a motor 3 and a wave gear device 4, and a load device 5 is connected to the wave gear device 4. A motor shaft encoder 6 is attached to the back end of a motor shaft 31 fixed coaxially to a rotor (not shown) of the motor 3. The motor position (rotational position of the motor shaft 31) is detected by the motor shaft encoder 6. The wave gear device 4 has a circular spline (C/S) 41, a flexspline (F/S) 42, and a wave generator (W/G) 43. An input shaft 44 of the wave gear device is linkably fixed in a coaxial manner to the wave generator 43, and the input shaft 44 of the wave gear device is also fixedly connected in a coaxial manner to the motor shaft

31. An output shaft 45 of the wave gear device is fixedly connected in a coaxial manner to the flexspline 42, and the output shaft 45 of the wave gear device is also dixedly connected to the load device 5.

The positioning system 1 constitutes a processor arranged as a semi-closed loop control system for positioning the load device 5 connected to the output shaft 45 of the wave gear device using position information of the motor shaft encoder 6, which is attached to the motor shaft 31. The inertia ratio of the motor 3 and the load device 5 is about 1:3 in terms of the motor shaft. The load position (rotational position of a load shaft 51) is measured using a load shaft encoder 7 attached to the load shaft 51 of the load device 5 in order to evaluate the results of modeling and compensating for the angular transmission errors of the wave gear device 3.

TABLE 1

| Specifications of Experimental Device | |
| --- | --- |
| Reduction Ratio (N) | 50 |
| F/S Number of Teeth (zf) | 100 |
| C/S Number of Teeth (zc) | 102 |
| Motor Shaft Encoder Resolution | 8,000 pulses/rotation |
| Load Shaft Encoder Resolution | 2,880,000 pulses/rotation |

(Actuator Modeling Including Relative Rotation-Synchronous Components)

(Modeling of Relative Rotation-Synchronous Components)

In general, an angular transmission error $\theta_{TE}$ is defined by Formula (1) using a motor position θm, a load position θl, and a reduction ratio N.

[Mathematical Formula 1]

$$\theta_{TE} = \theta_l - \frac{\theta_m}{N} \quad (1)$$

The term "relative rotation-synchronous components included in angular transmission errors" used herein refers to components that are present even in cases in which torque is not applied to the wave gear device 4, and that are brought about by a cumulative pitch error of the flexspline 42 and the circular spline 41 and fabrication errors such as the difference between the shaft centers of the wave gear device 4 and the load device 5. These components are generated in synchrony with the relative rotation of each constituent element of the wave generator 43, the flexspline 42, and the circular spline 41. The relative rotation-synchronous components can therefore be expressed by superposing a sine wave on the motor position θm, the load position θl, and the F/S-W/G relative position $\theta_{FW}$ (relative position between the flexspline 42 and the wave generator 43), which are relative positions of each of the constituent elements (41, 42, 43). Compensation of the components pertaining to the flexspline 42 in the processor arranged as a semi-closed loop control system is substantially impossible because load position information is necessary for compensating the components pertaining to the flexspline 42. Therefore, of the relative rotation-synchronous components, only the motor shaft synchronous component is indicated as the relative rotation-synchronous component θSync and modeled in Formula (2) below.

[Mathematical Formula 2]

$$\theta_{Sync}(\theta_m) = \sum_{i=1}^{n} A_i \sin(k_i \theta_m + \phi_i) \quad (2)$$

A relative rotation-synchronous component (motor shaft synchronous component) is modeled in the following sequence.

1) The angular transmission error of a single rotation of the load shaft under stabilized conditions is measured.

2) The angular transmission error is spectrally analyzed by applying the Fourier transformation to the motor position θm.

3) The phase Φi and the amplitude Ai of a spectrum whose amplitude is at or above a threshold value are extracted from integral harmonics synchronous with the relative rotation.

4) A model is created by inverse Fourier transformation in accordance with Formula (2).

Figure 2:
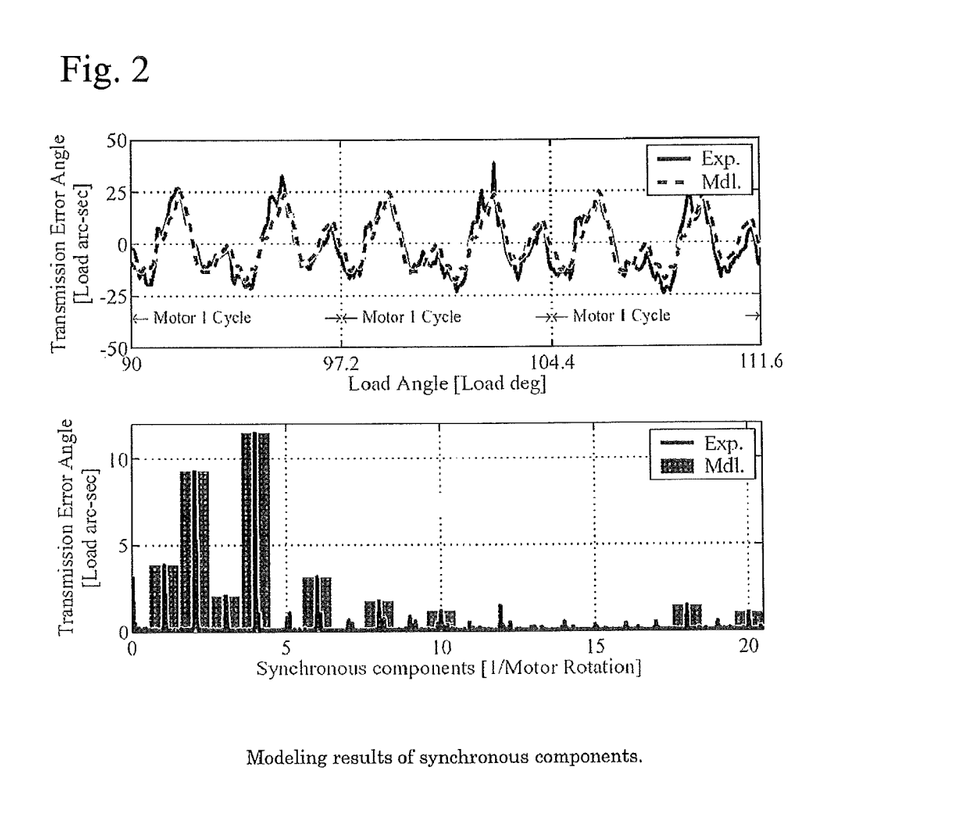
FIG. 2 is a graph showing the results of modeling relative rotation-synchronous components.

FIG. 2 shows the spectral waveform and the waveform of relative rotation-synchronous components (relative synchronous components of actual equipment) of the positioning system 1 in FIG. 1. The upper level of the drawing is the angular transmission errors measured while tiny feed operations were continuously made in increments of a single rotation of the load shaft, and the lower level is the spectrum of the angular transmission errors. It can be seen in the drawing that first-through fourth-order component amplitudes of motor rotation are prominent in the relative rotation-synchronous components and that up to $20^{th}$-order components are present at a maximum, and it can be confirmed that the actual equipment response can be reproduced with good precision by this model.

(Actuator Modeling)

Improving the torsional rigidity is structurally difficult in the wave gear device 4, and there is flexibility between the input shaft 44 of the wave gear device and the output shaft 45 of the wave gear device. In view of this, the characteristics of the positioning system 1 as a control object are modeled as a two-inertia model constructed from a motor-side inertia body including a motor rotor and the input shaft 44 of the wave gear device, and a load-side inertia body including the output shaft 45 of the wave gear device and the load device 5. The relative rotation-synchronous component θSync calculated from the motor position is applied as twisting between the two inertia bodies.

Figure 3:
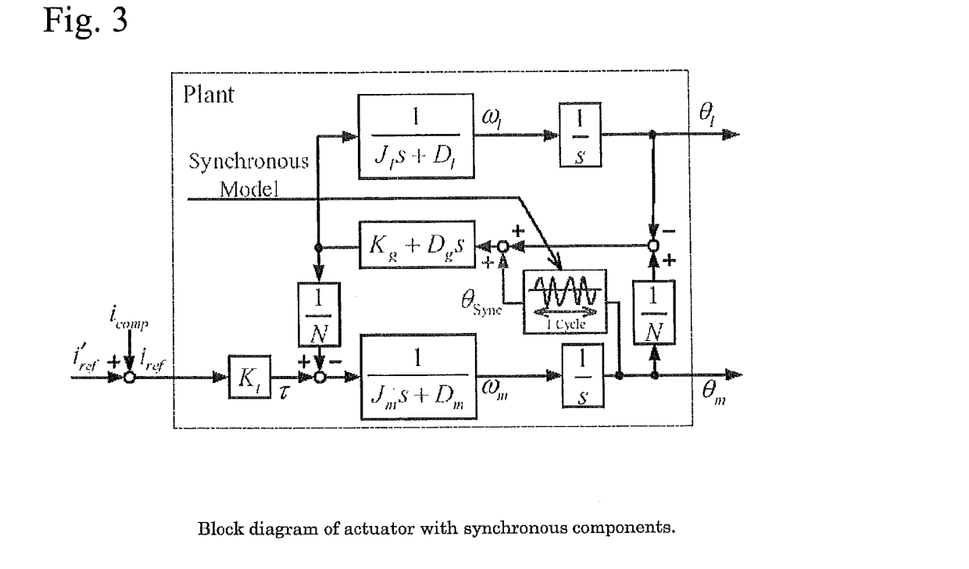
FIG. 3 is a block diagram showing a semi-closed loop control system for an actuator that includes motor shaft synchronous components.
Figure 4:
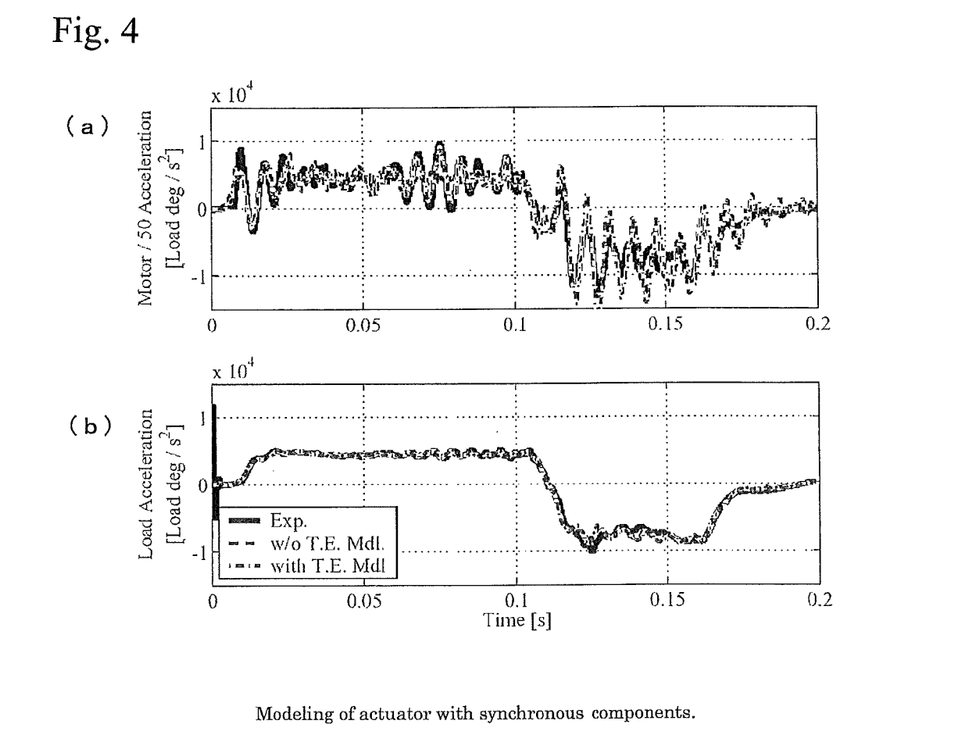
FIG. 4 is a graph showing the results of modeling an actuator that includes relative rotation-synchronous components.

FIG. 3 is a block diagram of an actuator thus modeled. The symbols in the drawing are as follows:
  Jm: Motor shaft inertia
  Dm: Viscous friction of motor shaft
  Jl: Load shaft inertia
  Dl: Viscous friction of load shaft
  Kg: Gear spring constant
  Dg: Viscous friction of gears
  N: Reduction ratio
  Kt: Torque constant
  θm: Motor position
  ωm: Motor velocity
  θl: Load position
  ωl: Load velocity
  θSync: Relative rotation-synchronous component (motor shaft synchronous component whose value is determined by the motor position)
  τ: Motor torque
  iref, i'ref: Current command
  icomp: Compensation current of relative rotation-synchronous component FIG. 4 shows the response of the actual actuator and a simulation response performed using the modeled actuator shown by the block diagram of FIG. 3, wherein the motor acceleration response is shown in FIG. 4(a), and the load acceleration response is shown in FIG. 4(b). In the drawing, the solid line shows the response of the actual actuator, the dashed line shows the response of a modeled actuator that is not provided with relative rotation-synchronous component model, and the dashed-dotted line shows the response of a modeled actuator that is provided with the relative rotation-synchronous component model. It can be seen in the drawing that the reproducibility of load acceleration and motor acceleration at a high velocity in the proximity of 0.075 [s] is improved by the addition of the relative rotation-synchronous component model. The non-linear spring characteristic Kg and a non-linear friction model for the motor and load shaft are incorporated into the present simulator. The large amplitude downward from 0.1 [s] in FIG. 4 is believed to be due to the non-linear spring characteristic. In the simulation below, the non-linear spring characteristic is assumed to be a linear approximation in the proximity of the point of origin, and a separate compensation method is applied to non-linear friction.

(Method for Compensating for Angular Transmission Error)

Figure 5:
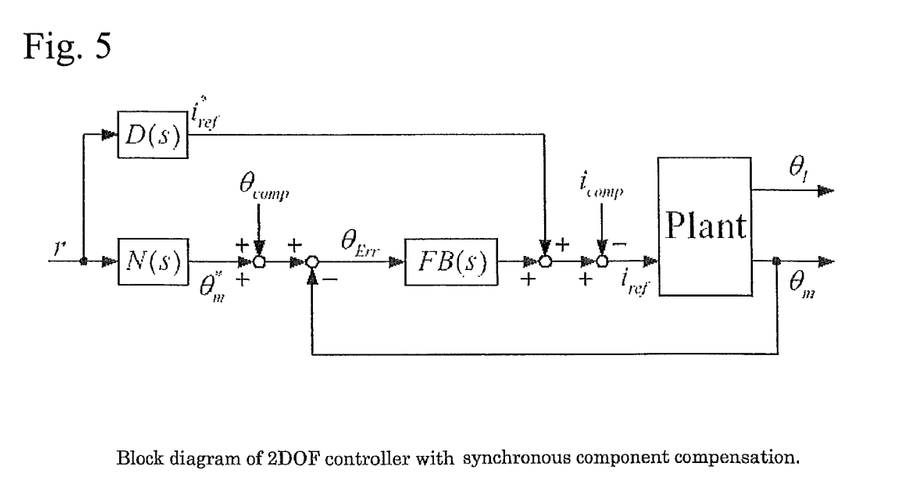
FIG. 5 is a block diagram showing a control system having two degrees of freedom to which the compensation method of the present invention has been applied.

FIG. 5 is a schematic block diagram showing a processor configured as a semi-closed loop control system demonstrating the compensation method according to the present invention. The symbols in the drawing are as follows:
Plant: Plant model of FIG. 3
FB(s): Feedback compensator
D(s), N(s): Feedforward compensator
i*ref: Feedforward current command
θ*m: Feedforward position command
θcomp: Motor position correction signal
$\theta_{Err}$: Deviation
r: Position command In the compensation method according to the present invention, the relative rotation-synchronous component θSync in FIG. 4 is considered to be an oscillation source, and the effect θl_Sync of the relative rotation-synchronous component on the load position is canceled out by the compensation current command icomp, resulting in a state in which there is no action of the apparent relative rotation-synchronous component, whereby the relative rotation-synchronous component is compensated. As made clear from the model in FIG. 3, the motor position produces an oscillatory response in cases in which the effect of the relative rotation-synchronous component on the load position is compensated. That is, the motor position must be intentionally made into an oscillatory response in order to improve control performance of the load position. The command value is therefore corrected in advance by the motor position correction signal θcomp.

The effects θm_Sync, θl_Sync of the relative rotation-synchronous component θSync on the motor position θm and the load position θl during response are derived, as is the compensation current command icomp necessary in order to cancel out the relative rotation-synchronous component θSync, in order to perform the compensation operation.

Figure 6:
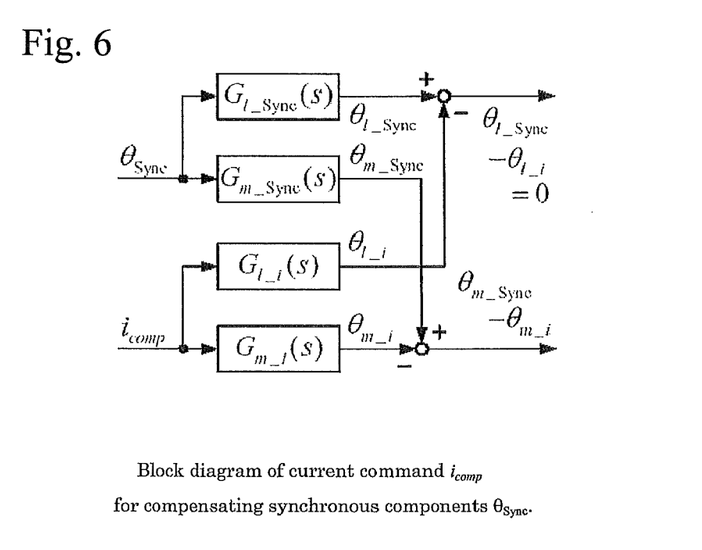
FIG. 6 is a block diagram of a control system in which a compensation current command is used as input, and a motor position and a load position are used as outputs.

FIG. 6 is a block diagram of the control system whose inputs are the relative rotation-synchronous component θSync and the compensation current command icomp for canceling out the relative rotation-synchronous component θl_Sync, and whose outputs are the motor position θm and the load position θl. In the drawing, Gm_Sync(s) and Gl_Sync(s) are defined by Formulas (3) and (4). Gm_i(s) and Gl_i(s) are characteristics that extend from the current command to the motor position and the load position respectively, and are defined by Formulas (5) and (6).

[Mathematical Formula 3]
$$G_{m\_Sync}(s) = \frac{\theta_{m\_Sync}(s)}{\theta_{Sync}(s)} \quad (3)$$

[Mathematical Formula 4]
$$G_{L\_Sync}(s) = \frac{\theta_{L\_Sync}(s)}{\theta_{Sync}(s)} \quad (4)$$

[Mathematical Formula 5]
$$G_{m\_i}(s) = \frac{\theta_m(s)}{i_{comp}(s)} \quad (5)$$

[Mathematical Formula 6]
$$G_{L\_i}(s) = \frac{\theta_l(s)}{i_{comp}(s)} \quad (6)$$

The relative rotation-synchronous component model θ*Sync adequately reproduces the relative rotation-synchronous component of the actual equipment, and the relationship of Formula (7) holds true if it is assumed that θ*Sync=θSync yields, making it possible to compensate for the effect of the relative rotation-synchronous component θSync of the actual equipment on the load position. The transfer function Ci(s) in the formula is a filter having Ci(s)=Gl_Sync(s)/Gl_i(s).

[Mathematical Formula 7]
$$\begin{aligned} G_{L\_Sync}(s)\theta_{Sync}(s) &= G_{L\_i}(s)i_{comp}(s) \\ &= G_{L\_i}(s)C_i(s)\theta^*_{Sync}(s) \end{aligned} \quad (7)$$

The relative order of the transfer function Ci(s) is a minus 2, and compensation performance is adversely affected when a filter designed to ensure proper functioning is added. As discussed previously in the section titled "Modeling of Relative Rotation-Synchronous Components," the relative rotation-synchronous component θSync can be modeled by superposing a sine wave, and because a sine wave allows for infinite-order differentiation, the relative rotation-synchronous component θSync can be differentiated to the second order in advance, and the proper functioning of the compensator is secured. In this case, the compensation current command icomp(s) can be calculated by Formula (8).

[Mathematical Formula 8]
$$\begin{aligned} i_{comp}(s) &= C_i(s)\theta^*_{Sync}(s) \\ &= C_i(s)\mathcal{L}(\theta^*_{Sync}(t)) \\ &= \frac{C_i(s)}{s^2}\mathcal{L}(\ddot{\theta}^*_{Sync}(t)) \\ &= \frac{C_i(s)}{s^2}\ddot{\theta}^*_{Sync}(s) \end{aligned} \quad (8)$$

The second-order differential θ''*Sync(t) of the relative rotation-synchronous component model necessary at this time can be calculated by Formula (9).

[Mathematical Formula 9]

$$\ddot{\theta}^*_{Sync}(t) = \frac{d^2}{dt^2}\left\{\sum_{i=1}^{n} A_i \sin(k_i \theta_m(t) + \phi_i)\right\} \quad (9)$$

$$= \ddot{\theta}_m(t) \sum_{i=1}^{n} k_i A_i \cos(k_i \theta_m(t) + \phi_i) -$$

$$\dot{\theta}_m^2(t) \sum_{i=1}^{n} k_i^2 A_i \sin(k_i \theta_m(t) + \phi_i)$$

Figure 7:
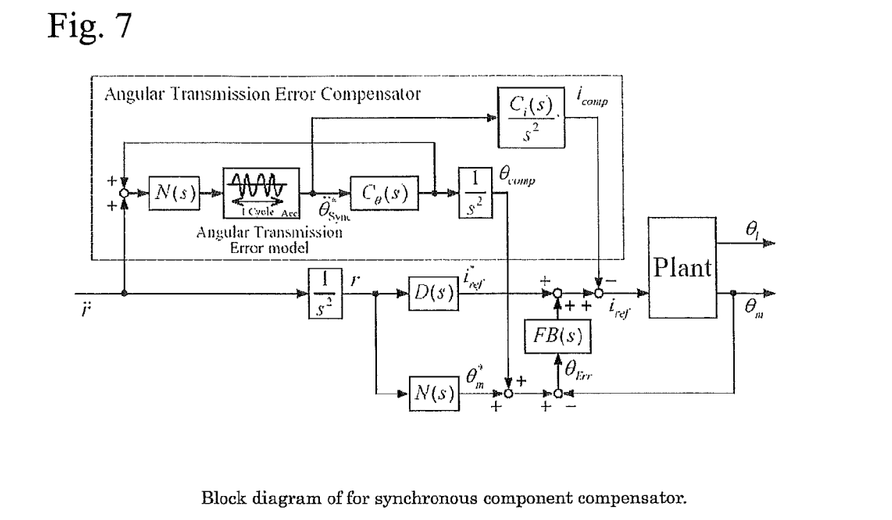
FIG. 7 is a block diagram showing a processor arranged as a semi-closed loop control system used for compensating relative rotation-synchronous components to which the present invention has been applied.

The motor position correction signal θcomp for compensating for the effect of a relative rotation-synchronous component on the load position is then determined. For the motor position deviation θErr in FIG. 5, the relationship θcomp(s)=θm_Sync(s)+θm_i(s) holds true at θErr=0. The motor position correction signal θcomp can therefore be calculated in accordance with Formula (10) by taking into account the proper functioning of the compensator and by using the second-order differential θ"*Sync(t) in the same manner as when the compensation current command icomp is derived. FIG. 7 shows a block diagram of the entire control system including the relative rotation-synchronous component compensator derived as described above.

[Mathematical Formula 10]

$$\theta_{comp}(s) = \theta_{m\_Sync}(s) + \theta_{m\_i}(s) \quad (10)$$

$$= G_{m\_Sync}(s)\theta_{Sync}(s) + G_{m\_i}(s)\frac{C_i(s)}{s^2}\ddot{\theta}^*_{Sync}(s)$$

$$= \frac{1}{s^2}\left(G_{m\_Sync}(s) + s^2 G_{m\_i}(s)\frac{C_i(s)}{s^2}\right)\ddot{\theta}^*_{Sync}(s) \equiv$$

$$\frac{1}{s^2}C_\theta(s)\ddot{\theta}^*_{Sync}(s)$$

(Experimental Confirmation of Compensation Results)

The compensation results concerning the method for compensating for relative rotation-synchronous components were verified through experiments on actual equipment.

(1) Experimental Conditions

A distinctive feature of the compensation method according to the present invention is not only that the effect of static relative rotation-synchronous components on a load shaft under stabilized conditions is reduced in the same manner as in conventional techniques, but also that the oscillation component caused by dynamic relative rotation-synchronous components during positioning response is compensated. The relative rotation-synchronous component θSync is a component generated by the relative rotation of the constituent elements of the wave gear device, and it is therefore necessary to carefully set the feed angle in a positioning experiment.

Conventional compensation of angular transmission errors aims to reduce the variability of the static load position, and experiments have been performed at a feed angle at which meshing varies with each positioning so that the relative rotation-synchronous components have differing values under stabilized conditions. One of the objects of the compensation method according to the present invention is also to reduce the variability of the static load position, and evaluation is preferably conducted at a feed angle determined in the same manner as in the past.

On the other hand, in the compensation of dynamic relative rotation-synchronous components newly targeted by the compensation method according to the present invention, the effect of the relative rotation-synchronous components varies with the feed angle at which the gears mesh differently with each response, and the oscillations of the relative rotation-synchronous components during each positioning response are canceled out when multiple responses are averaged, making evaluation difficult. In view of this, compensation of the dynamic relative rotation-synchronous components was evaluated by conducting an experiment at a feed angle at which meshing is constant in each positioning.

Static evaluation and dynamic evaluation were therefore evaluated separately by using the following feed angles in the experiment on the compensation of the relative rotation-synchronous components: 12.1 [Motor rev.]=87.12 [Load deg] as the static evaluation angle at which the meshing between the flexspline and the circular spline is different in each positioning, and 12 [Motor rev.]=86.4 [Load deg] as the dynamic evaluation angle at which the meshing remains constant in each positioning.

FIG. 8(a) shows the spectrum of the relative rotation-synchronous component model. As described in the previous section (Modeling of Relative Rotation-Synchronous Components), the relative rotation-synchronous components include high-order components whose maximum exponent is equal to 20. However, it was decided to perform compensation using up to a fourth-order model because the compensating current is known to increase when compensation is performed up to high-order components. FIG. 8(b) shows the output of a model of the relative rotation-synchronous components at various positioning responses. Here, the motor accelerates to 0.2 [s] and then decelerates. Analysis of the drawing suggests that the response of a model based on components having all possible orders can be simulated for the responses in a model based on up to a fourth-order component, which is shown by the dashed line, allowing the relative rotation-synchronous components to be adequately compensated.

(2) Experimental Results

1) Experiment on Compensating for Static Relative Rotation-Synchronous Components Continuous constant positioning operations (240 [cycles], interval: 2 [s]) were performed at a feed angle of 87.12 [Load deg] at which meshing between W/G-C/S varied in each positioning to evaluate static compensation precision according to the compensation method of the present invention. The motor position response is shown in FIG. 9(a), the load position response is shown in FIG. 9(b), and the load acceleration response is shown in FIG. 9(c).

Figure 9:
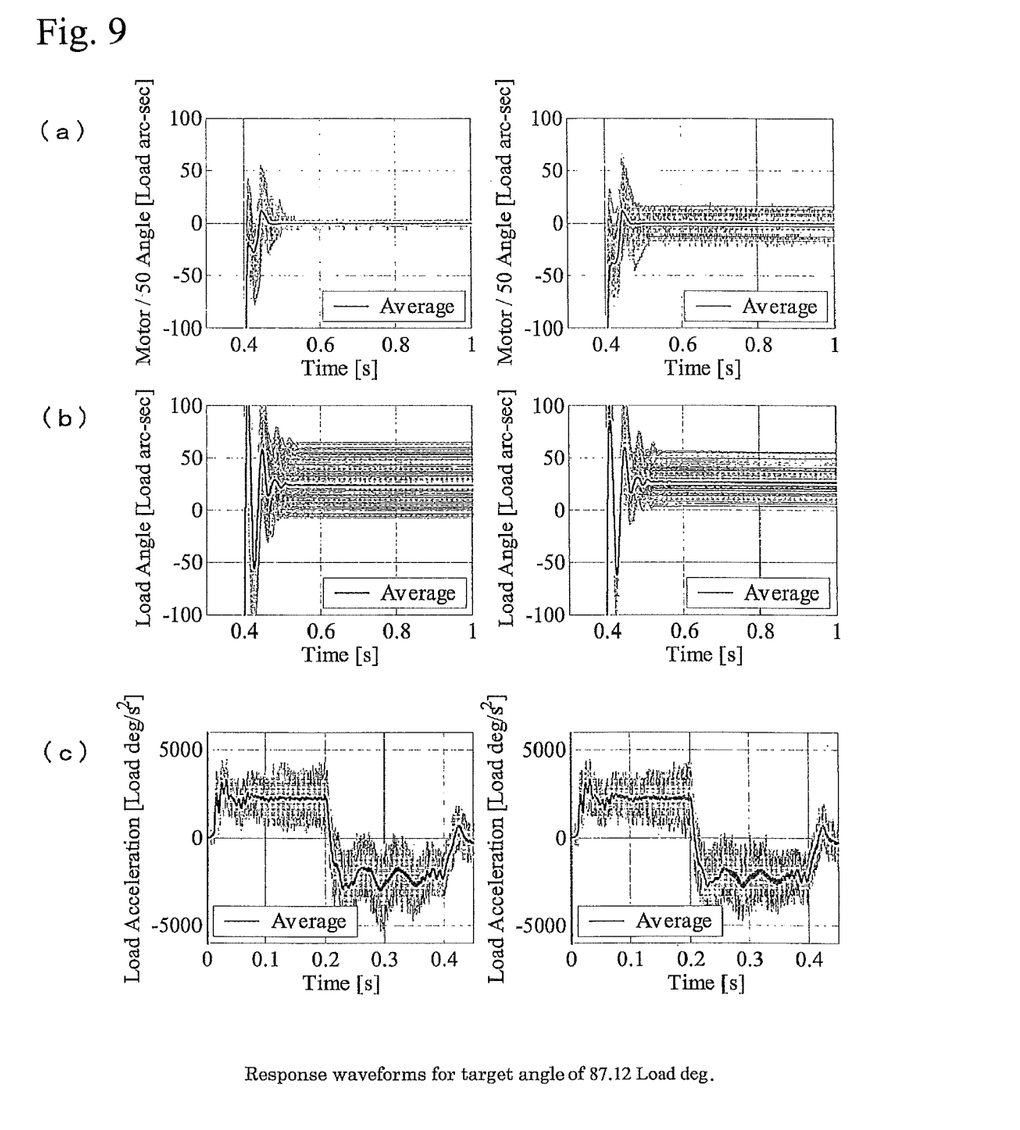
FIG. 9 is a graph showing the results of an experiment on compensating for static relative rotation-synchronous components.

The left side of each of FIGS. 9(a) through 9(c) shows the uncompensated response, and the right side shows the compensated response. The heavy line in the drawing is the average response of 239 cycles of the positioning operation. It can be confirmed based on the motor position responses in FIG. 9(a) that the motor position fluctuates under stabilized conditions in accordance with the motor position correction signal when the relative rotation-synchronous components are compensated. As a result, it can be confirmed based on the load position responses in FIG. 9(b) that the variability of the load position is reduced under stabilized conditions at the time of compensation. It can be confirmed based on the load acceleration responses in FIG. 9(c) that oscillations are generated in individual responses of load acceleration at 0.1 to 0.2 [s], at which oscillations brought about by relative rotation-synchronous components are prominent, but no oscillations can be confirmed in the average response.

The effects of static angular transmission errors under stabilized conditions are quantitatively evaluated in Table 2. The table also shows the average and the ±3σ value of the load position difference at 1.5 [s], at which positioning is completed. The lower level of each entry is the evaluation value normalized based on the uncompensated value. It can be confirmed based on Table 2 that the load position variability under stabilized conditions can be reduced to 63% in terms of 3σ value with compensation in comparison with the uncompensated values, and that compensation of the relative rotation-synchronous components has an effect.

TABLE 2

Comparison of Compensation Results of Relative Rotation-Synchronous Components (Feed Angle: 87.12 [Load deg])

|  | No compensation | Compensation performed | |
|---|---|---|---|
| 3σ | 49.2 | 31.2 | [arc-sec] |
|  | 100 | 63 | [%] |
| Average | 24.1 | 26.7 | [arc-sec] |
|  | 100 | 111 | [%] |

2) Experiment on Compensating for Dynamic Angular Transmission Errors

Figure 10:
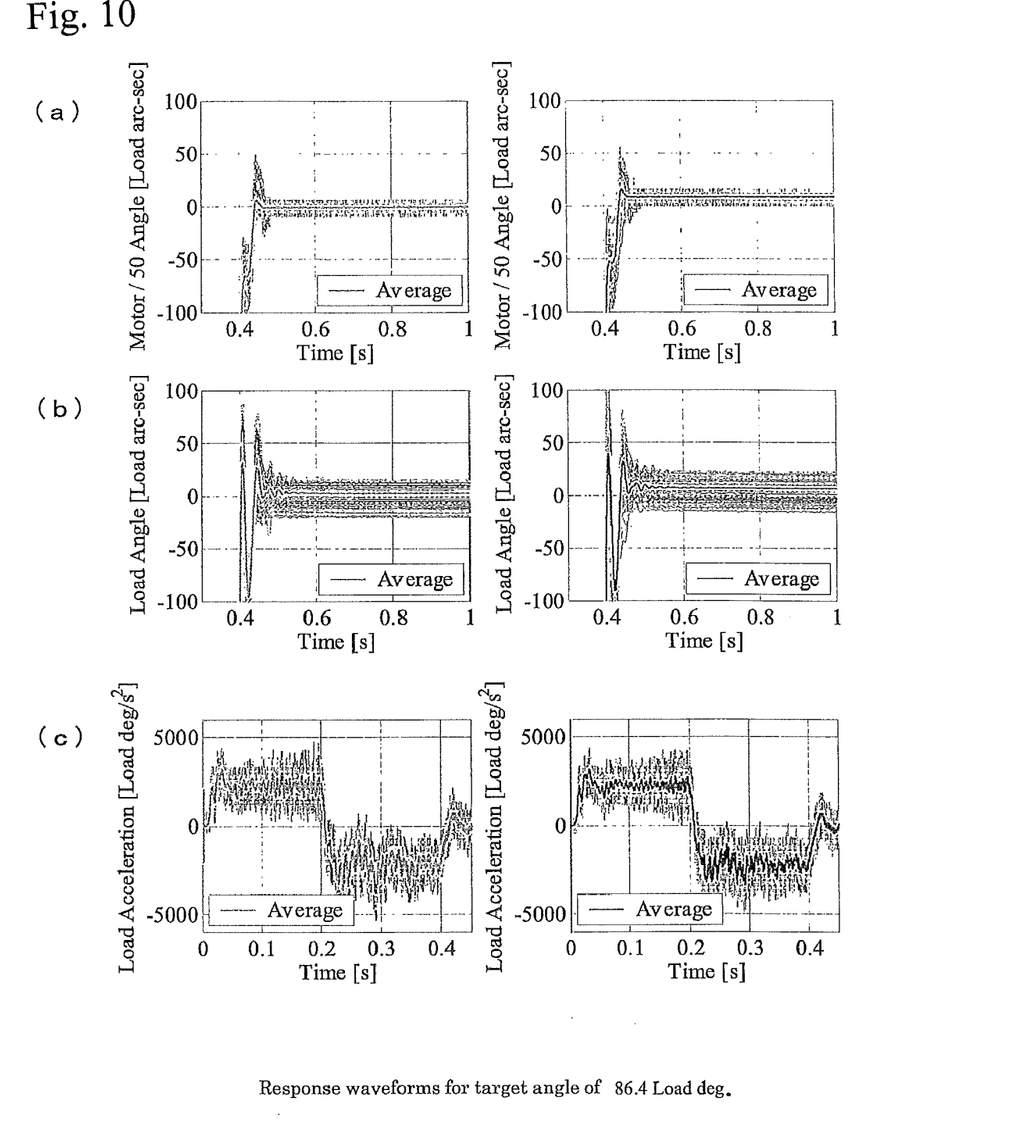
FIG. 10 is a graph showing the results of an experiment on compensating for a dynamic angular transmission error.

An experiment designed to evaluate dynamic relative rotation-synchronous components was performed under the same conditions as the aforementioned experiment on compensating for static relative rotation-synchronous components, except that 86.4 [Load deg] was used for the feed angle at which meshing between each rotation of the flexspline and the circular spline was the same with each positioning. The motor position response is shown in FIG. 10(*a*), the load position response is shown in FIG. 10(*b*), and the load acceleration response is shown in FIG. 10(*c*). The left side of each of FIGS. 10(*a*) through 10(*c*) shows the uncompensated response, and the right side shows the compensated response. The heavy line in the drawing is the average response of 240 cycles of the positioning operation.

It can be seen based on the load position response in FIG. 10(*b*) that the load position under stabilized conditions is mostly invariable even without compensation, and the compensation evaluation of the static angular transmission errors shown in Table 3 produces no visible compensation results either. This is because the relative rotation-synchronous components under stabilized conditions assume only the usual values at feed angles at which the gear meshing remains the same as described above, and no variability is generated by the relative rotation-synchronous components regardless of the presence or absence of compensation. It can be seen from the load acceleration in FIG. 10(*c*) that oscillations can be reduced in the proximity of 0.1 to 0.3 [s], at which the motor turns at high speed, when the relative rotation synchronous-components are compensated. The method for compensating for relative rotation-synchronous components according to the present invention can thereby be regarded as being able to dynamically compensate oscillations brought about by relative rotation-synchronous components during positioning response.

Figure 8:
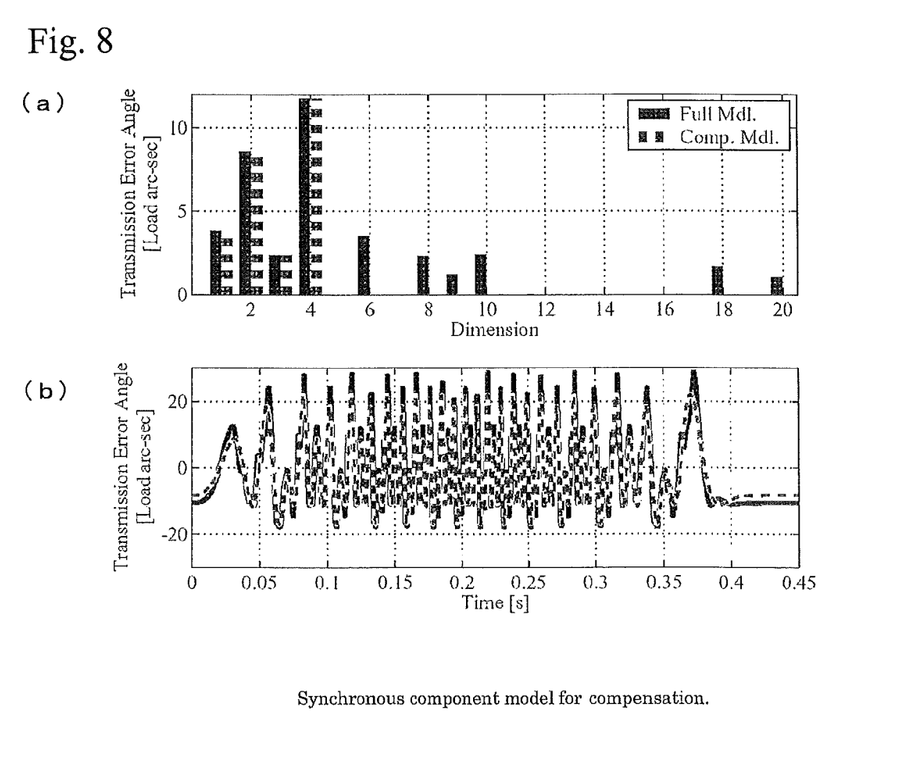
FIG. 8 is a graph showing a model of relative rotation-synchronous components.

Large oscillations occurring before 0.1 [s], which is immediately after movement begins, and at 0.2 to 0.4 [s], which is the deceleration range, differ from the cycles of the relative rotation-synchronous components in FIG. 8(*b*) and are thought to be the effect of non-linear elements other than relative rotation-synchronous components, such as static friction. These must be compensated for separately.

TABLE 3

Comparison of Compensation Results of Relative Rotation-Synchronous Components (Feed Angle: 86.4 [Load deg])

|  | No compensation | Compensation performed | |
|---|---|---|---|
| 3σ | 25.9 | 25.5 | [arc-sec] |
|  | 100 | 98 | [%] |
| Average | 1.8 | 6.1 | [arc-sec] |
|  | 100 | 333 | [%] |

A compensation method was thus proposed that would allow the effect of relative rotation-synchronous components as one type of angular transmission errors to be compensated not only under stabilized conditions, but also during response with the aim of improving positioning precision and inhibiting oscillation in an actuator that includes a wave gear device; the characteristics of an entire actuator that include angular transmission errors were modeled; and the relative rotation-synchronized components were compensated for by the model-base feedforward compensation. It was confirmed in a compensation-evaluating experiment using testing equipment that the variability under stable conditions can be reduced to 35%, and oscillations of the load shaft in the positioning response can be reduced.

The invention claimed is:
1. A method for compensating for an angular transmission error of a wave gear device in cases in which an actuator for reducing the speed of output rotation of a motor via the wave gear device and transmitting the output rotation to a load device is driven and controlled by a processor arranged as a semi-closed loop control for controlling the position of the load shaft of the load device on the basis of the detected position of the motor shaft of the motor; comprising:

determining, by the processor, a motor shaft synchronous component θSync occurring in synchrony with a motor position θm, which is a rotational position of the motor shaft, by Formula (A), the motor shaft synchronous component being an angular transmission error component that occurs in synchrony with the relative rotation of each constituent element of the wave gear device, and the motor shaft synchronous component being present even in cases in which torque is not applied to the wave gear device $$\theta_{Sync}(\theta_m) = \sum_{i=1}^{n} A_i \sin(k_i \theta_m + \phi_i); \quad (A)$$

representing the actuator as a two-inertia model constructed from a motor-side inertia body including the rotor of the motor and the input shaft of the wave gear device, and a load-side inertia body including the output shaft of the wave gear device and the load device;
applying the motor shaft synchronous component θSync (θm) calculated from the motor position θm as twisting between the motor-side inertia body and the load-side inertia body;
considering the motor shaft synchronous component θSync (θm) to be an oscillation source;
correcting a motor current command iref by a compensation current command icomp determined by Formula (B)

$$i_{comp}(s) = \frac{C_i(s)}{s^2}\ddot{\theta}_{Sync}(s), \quad (B)$$

where $C_i(s)$ is a transfer function, and
$\theta''$Sync is the second-order differential of the motor shaft synchronous component; and,
correcting the motor position command r by the motor position correction signal θcomp determined by Formula (C)

$$\theta_{comp}(s) = \frac{1}{s^2}C_\theta(s)\ddot{\theta}_{Sync}(s), \quad (C)$$

where $C\theta(s)$ is a transfer function;
whereby compensating for the effect of the motor shaft synchronous component θSync (θm) on the load position θl, which is the rotational position of the load shaft.

* * * * *